United States Patent
Yamamoto et al.

(10) Patent No.: US 7,675,834 B2
(45) Date of Patent: Mar. 9, 2010

(54) OPTICAL PICKUP FOR THREE DIFFERENT TYPES OF OPTICAL DISCS AND RECORDING AND/OR REPRODUCING APPARATUS USING SAME

(75) Inventors: Kenji Yamamoto, Kanagawa (JP); Katsutoshi Sato, Tokyo (JP); Noriaki Nishi, Kanagawa (JP); Midori Kanaya, Tokyo (JP); Shinya Makita, Kanagawa (JP)

(73) Assignee: Sony Corporation, Tokyo (JP)

( * ) Notice: Subject to any disclaimer, the term of this patent is extended or adjusted under 35 U.S.C. 154(b) by 948 days.

(21) Appl. No.: 11/113,037

(22) Filed: Apr. 25, 2005

(65) Prior Publication Data
US 2005/0270925 A1     Dec. 8, 2005

(30) Foreign Application Priority Data
May 14, 2004    (JP) .............................. 2004-145638

(51) Int. Cl.
*G11B 7/135*    (2006.01)
(52) U.S. Cl. ............................................... 369/112.23
(58) Field of Classification Search ........................ None
See application file for complete search history.

(56) References Cited

U.S. PATENT DOCUMENTS

| | | | | |
|---|---|---|---|---|
| 6,449,235 | B1 * | 9/2002 | Kim et al. ............... | 369/112.01 |
| 6,967,919 | B2 * | 11/2005 | Arikawa et al. ............. | 369/121 |
| 7,151,735 | B2 * | 12/2006 | Arai et al. ............... | 369/112.05 |
| 7,193,954 | B2 * | 3/2007 | Yagi et al. ............... | 369/112.01 |
| 7,206,276 | B2 * | 4/2007 | Kimura et al. .......... | 369/112.08 |
| 2001/0008513 | A1 * | 7/2001 | Arai et al. ............... | 369/112.08 |
| 2003/0185133 | A1 * | 10/2003 | Kaiho et al. ............. | 369/112.1 |
| 2004/0036972 | A1 * | 2/2004 | Kimura et al. .............. | 359/570 |
| 2004/0213134 | A1 * | 10/2004 | Takada et al. .......... | 369/112.08 |

(Continued)

FOREIGN PATENT DOCUMENTS

JP    2000-276766    10/2000

(Continued)

OTHER PUBLICATIONS

U.S. Appl. No. 11/116,303, filed Apr. 28, 2005, Nishi et al.

(Continued)

*Primary Examiner*—Peter Vincent Agustin
(74) *Attorney, Agent, or Firm*—Oblon, Spivak, McClelland, Maier & Neustadt, L.L.P.

(57) ABSTRACT

An optical pickup including a light source unit having a first radiating unit for radiating a light beam of a first wavelength, a second radiating unit for radiating a light beam of a second wavelength and a third radiating unit for radiating a light beam of a third wavelenght, a collimator lens having different focal lengths dependent on the first to third wavelengths, and an objective lens for condensing light beams, radiated from the first to third radiating units, on an information recording surface of an optical disc, and a recording and/or reproducing apparatus employing the optical pickup, are disclosed. The optical pickup and the recording and/or reproducing apparatus are used for recording and/or reproducing the information for plural sorts of the information recording medium of different formats. Certain components of the optical pickup are used in common for the different light beams to reduce the size of the device as well as to correct the spherical aberration.

22 Claims, 2 Drawing Sheets

U.S. PATENT DOCUMENTS

2005/0030878 A1* 2/2005 Park et al. .............. 369/112.08
2005/0219987 A1* 10/2005 Hashimura et al. ..... 369/112.08

FOREIGN PATENT DOCUMENTS

| JP | 2001-043559 | 2/2001 |
| JP | 2001-56952 | 2/2001 |
| JP | 2001-319363 | 11/2001 |
| JP | 2002-304763 | 10/2002 |
| JP | 2002-334476 | 11/2002 |
| JP | 2003-36559 | 2/2003 |
| JP | 2003-132573 | 5/2003 |
| JP | 2004-79146 | 3/2004 |
| JP | 2005-293765 | 10/2005 |
| JP | 2005-293775 | 10/2005 |
| JP | 2005-293777 | 10/2005 |
| JP | 2005-317105 | 11/2005 |
| WO | WO 2005/101393 A1 | 10/2005 |

OTHER PUBLICATIONS

U.S. Appl. No. 11/119,927, filed May 3, 2005, Sato et al.
U.S. Appl. No. 11/118,349, filed May 2, 2005, Yamamoto et al.

* cited by examiner

OPTICAL PICKUP FOR THREE DIFFERENT TYPES OF OPTICAL DISCS AND RECORDING AND/OR REPRODUCING APPARATUS USING SAME

CROSS REFERENCES TO RELATED APPLICATIONS

The present invention contains subject matter related to Japanese Patent Application JP 2004-145638 filed in the Japanese Patent Office on May 14, 2004, the entire contents of which being incorporated herein by reference.

BACKGROUND OF THE INVENTION

1. Field of the Invention

This invention relates to an optical pickup for recording and/or reproducing the information for an optical disc, designed to optically record and/or reproduce the information, such as a magneto-optical disc or a phase-change disc.

2. Description of Related Art

As the format for the next-generation optical disc, such a format employing a light source with a wavelength on the order of 400 to 410 nm, by blue purple semiconductor laser, and an objective lens with a numerical aperture (NA) of 0.85, is currently used. As an optical disc, illuminated by laser light with the wavelength on the order of 405 nm, such an optical disc having a cover layer of a thin thickness of, for example, 0.1 mm, for protecting a signal recording layer, has been proposed.

For providing an optical pickup, used with the next-generation optical disc, such a one which is compatible with optical discs of different formats, such as state-of-the-art CD (Compact Disc) or DVD (Digital Versatile Disc), is desirable. That is, an optical pickup and a recording and/or reproducing apparatus, compatible with optical discs different in disc structures and, concomitantly, in laser specifications, are needed.

As apparatus compatible with optical discs of different formats, there are those having plural optical systems and in which the respective objective lenses are switched from one wavelength to another. However, a changeover mechanism for plural sorts of objective lenses, complex in structure, is required, thus raising costs. On the other hand, since the actuator becomes bulky in size, it is difficult to reduce the size of the apparatus.

There is also a two wavelength compatible optical pickup in which part of the optical system, such as an objective lens, is co-owned (for example, see Patent Publication 1, Japanese Laid-Open Patent Publication 2002-236253). In an optical pickup, adapted for coping with optical discs, different in formats, there is raised a problem that spherical aberration is produced due to the difference in the wavelengths of the laser light radiated for respective optical discs or in the thickness of the cover layers of the discs, thus affecting recording and/or reproducing characteristics.

As the optical pickup having means for correcting the spherical aberration, there is such an optical pickup in which a collimator lens is moved along the optical axis. In this optical pickup, there is raised such a problem that spherical aberration is produced due to the difference in wavelengths of the laser light beams radiated to the optical discs, and in the thickness of the cover layers of the discs, thus affecting recording and/or reproducing characteristics.

As the optical pickup, having means for correcting the spherical aberration, there is such an optical pickup in which a collimator lens is moved in the direction of the optical axis.

In such optical pickup, the spherical aberration for the light beams radiated from different light sources is corrected by displacing the collimator lens. With this optical pickup, the optical discs of different formats are coped with by adjusting the locations of the light source units, provided at different positions, and by displacing the collimator lens. However, should this configuration be adapted to a three wavelength compatible optical pickup, it is necessary to provide a complicated mechanism of, for example, a three-wavelength optical axis combining device, to render it more difficult to reduce the size of the apparatus.

If, in an attempt to reduce the size of the three wavelength compatible optical pickup, light beams are radiated from a radiating unit, arranged at approximately the same light source unit, and which is adapted for radiating the light beams, the location of the light source unit cannot be adjusted, so that, in case the refractive index of the glass is varied with wavelengths and hence the focal length of the collimator lens is changed, an optimum position relationship between a light emitting point and the collimator lens differs from one wavelength to the next.

As may be seen from the foregoing, it is extremely difficult to correct the spherical aberration of the optical pickup, adapted for realization of the three wavelength compatibility of the next-generation optical disc, DVD and the CD, and to reduce the size thereof simultaneously.

SUMMARY OF THE INVENTION

It is desirable to provide an optical pickup in which the information may be recorded and/or reproduced for plural sorts of the optical information recording mediums of different formats, using light beams of different wavelengths, radiated from plural radiating units, provided in the light source unit, as the spherical aberration is optimally corrected, and in which the optical pickup may be reduced in size by employing a common collimator lens and a common objective lens, and a recording and/or reproducing apparatus employing the optical pickup.

For accomplishing the above object, the and/or present invention provides an optical pickup including a light source unit having a first radiating unit for radiating a light beam of a first wavelength, a second radiating unit for radiating a light beam of a second wavelength and a third radiating unit for radiating a light beam of a third wavelength, a collimator lens having different focal lengths dependent on the first to third wavelengths, and an objective lens for condensing light beams, radiated from the first to third radiating units, on a signal recording surface of an optical disc.

For accomplishing the above object, the present invention also provides a recording and/or reproducing apparatus including an optical pickup for recording and/or reproducing the information for an optical disc and disc rotating driving means for rotationally driving the optical disc, wherein the optical pickup includes a light source unit having a first radiating unit for radiating a light beam of a first wavelength, a second radiating unit for radiating a light beam of a second wavelength and a third radiating unit for radiating a light beam of a third wavelength, a collimator lens having different focal lengths dependent on the first to third wavelengths, and an objective lens for condensing light beams, radiated from the first to third radiating units, on a signal recording surface of an optical disc.

With the recording and/or reproducing apparatus according to the present invention, the objective lens and the collimator lens of the optical pickup are used in common for optical information recording mediums of different formats.

The signals may be recorded and/or reproduced satisfactorily, and plural sorts of the optical information recording mediums may be coped with, at the same time as the apparatus may be simplified in structure and reduced in size to reduce production costs.

DESCRIPTION OF THE PREFERRED EMBODIMENTS

Figure 1:
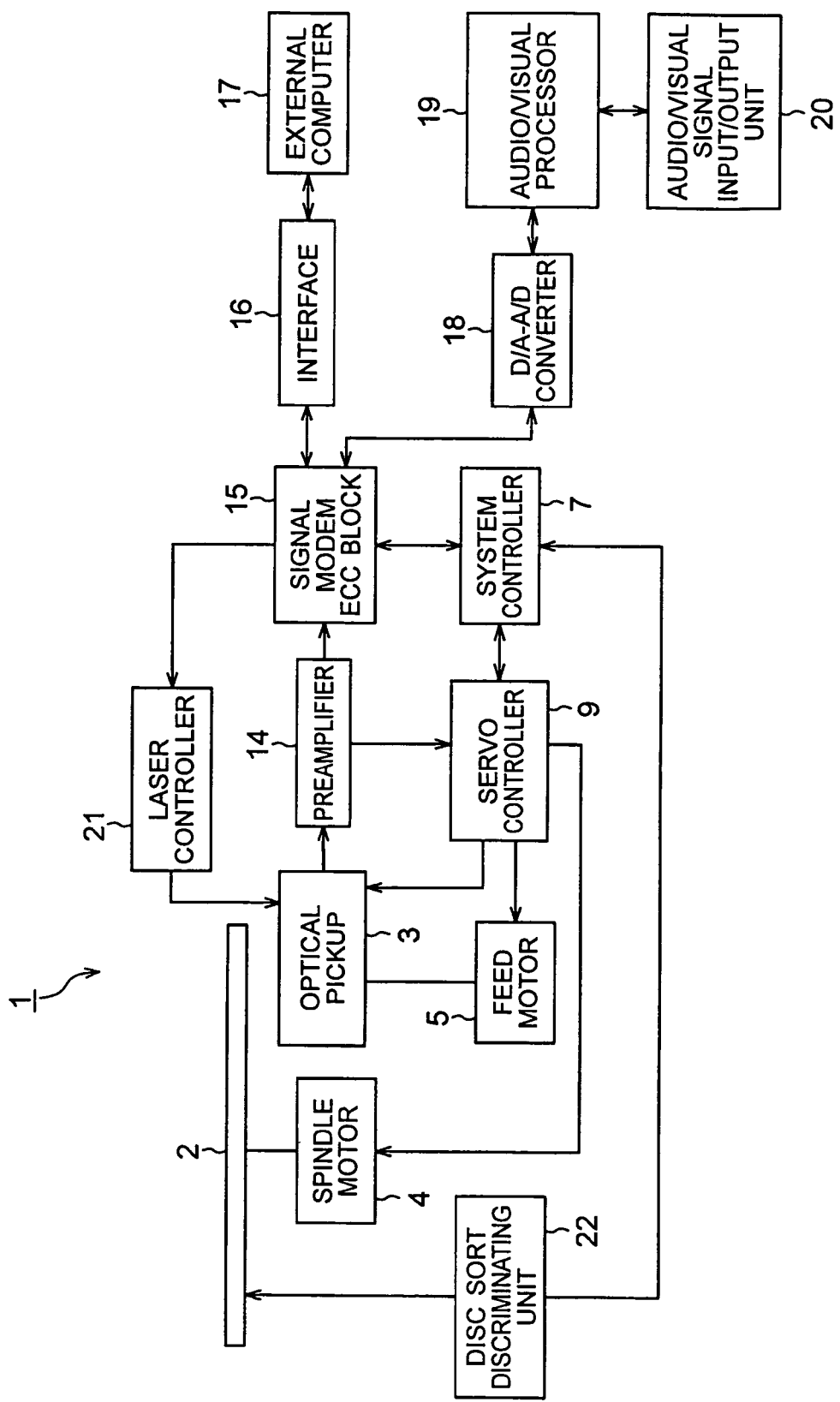
FIG. 1 is a block diagram showing the configuration of a recording and/or reproducing apparatus embodying the present invention.

Referring to the drawings, a recording and/or reproducing apparatus, employing an optical pickup, according to the present invention, will be explained in detail.

Referring to FIG. 1, a recording and/or reproducing apparatus 1 according to the present invention includes an optical pickup 3 for recording and/or reproducing the information from an optical disc 2, a spindle motor 4, as driving means for rotationally driving the optical disc 2, and a feed motor 5 for displacing the optical pickup 3 along the radius of the optical disc 2. The present recording and/or reproducing apparatus 1 is such apparatus providing for compatibility for three standards for enabling recording and/or reproduction of three sorts of optical discs 2 different in formats and an optical disc having plural recording layers superposed one on others.

The recording and/or reproducing apparatus 1 is adapted for recording and/or reproducing the information for optical discs 2, such as CD (Compact-Disc), DVD (Digital Versatile Disc), CD-R (Recordable) and DVD-R (Recordable), that permit recording the information, CD-RW (ReWritable), DVD-RW (Re-Writable) and DVD+RW (ReWritable), that permit rewriting the information, an optical disc that permits high density recording by employing semiconductor laser with the short wavelength of the emitted light of the order of 405 nm (blue purple color), or a magneto-optical disc.

It is assumed in the following that, as the three different optical discs, for which the information may be recorded and/or reproduced by the recording and/or reproducing apparatus 1, a first optical disc 11, having a protective substrate thickness of 0.1 mm, and which permits high density recording, with the use of a light beam with a wavelength of the order of 405 nm, as recording and/or reproducing light, a second optical disc 12, having a protective substrate thickness of 0.6 mm, and which permits high density recording, with the use of a light beam with a wavelength of the order of 655 nm, as recording and/or reproducing light, such as DVD, and a third optical disc 12, having a protective substrate thickness of 1.2 mm, and which permits high density recording, with the use of a light beam with a wavelength of the order of 785 nm, as recording and/or reproducing light, such as CD, are used.

In the recording and/or reproducing apparatus 1, the spindle motor 4 and the feed motor 5 are driven in a controlled manner, in dependence upon the disc sort, by a servo controller 9, which is controlled on the basis of a command from a system controller 7, also operating as disc sort discriminating means. The spindle motor 4 and the feed motor 5 are each driven at a predetermined rpm, depending on the disc sort, that is, depending on whether the target disc is the first optical disc 11, second optical disc 12 or the third optical disc 13.

The optical pickup 3 is an optical pickup having a three wavelength compatible optical system, and radiates light beams of different wavelengths to the recording layers of the optical discs of different standards, while detecting the light beams reflected back from the recording layer. The optical pickup 3 sends signals, associated with the respective light beams, from the detected reflected light.

An output of the preamplifier 14 is sent to a signal modem and error correction coding block, referred to below as a signal modem ECC block 15. This signal modem ECC block 15 modulates/demodulates signals and appends ECC (error correction codes). The optical pickup 3 illuminates a light beam to the recording layer of the rotating optical disc 2, in accordance with a command from the signal modem ECC block 15, to record and/or reproduce signals for the optical disc 2.

The preamplifier 14 is configured for generating focusing error signals, tracking error signals and RF signals, for example, based on signals corresponding to detected light beams differing from one format to another. Depending on the sorts of the optical recording mediums, to be recorded and/or reproduced, preset processing, such as demodulation or error correction, is carried out, based on standards for the optical disc 2, by e.g. the servo controller 9 or the signal modem ECC block 15.

In case the recorded signals, demodulated by the signal modem ECC block 15, are those for storage on a computer, the signals are sent over an interface 16 to an external computer 17. This enables e.g. the external computer 17 to receive signals recorded on the optical disc 2 as replay signals.

In case the recorded signals, demodulated by the signal modem ECC block 15, are those for audio/visual use, the signals are digital-to-analog converted by a D/A converter of a D/A-A/D converter 18, and the resulting signals are sent to an audio/visual processor 19, where the signals are subjected to audio/visual processing. The resultant signals are sent via an audio/visual signal input/output unit 20 to, for example, an external imaging/projecting device, not shown.

In the optical pickup 3, control of the feed motor for causing movement of the optical pickup to a preset recording track on the optical disc, control of the spindle motor and driving control along the focusing and tracking directions of a biaxial actuator, holding an objective lens, operating as light condensing means in the optical pickup 3, are taken charge of by the servo controller 9.

A laser controller 21 controls the laser light source of the optical pickup 3. In particular, in the present embodiment, the laser controller 21 exercises control for varying the output power of the laser light source depending on whether the operating mode is the recording mode or the reproducing mode. The laser controller also exercises control for varying an output power of the laser light source depending on the sort of the optical disc 2. The laser controller 21 also switches the laser light sources of the optical pickup 3 depending on the sort of the optical disc 2 as detected by a disc sort discriminating unit 22.

The disc sort discriminating unit 22 is able to detect the different formats of the optical disc 2 from e.g. surface reflectivity or difference in shape of the first to third optical discs 11 to 13.

The blocks that make up the recording and/or reproducing apparatus 1 are designed and constructed for performing signal processing, in accordance with the specifications of the optical disc loaded thereon, responsive to the results of detection by the disc sort discriminating unit 22.

The system controller 7 discriminates the sort of the optical disc 2 based on the results of detection sent from the disc sort discriminating unit 22. For discriminating the sort of the optical recording medium, such a technique of providing a detection hole in a cartridge and detecting the hole using a contact detection switch or a push switch may be used if the optical recording medium is of the type accommodated in a cartridge. For discriminating the recording layers in the same optical disc, such a technique may be used in which, based on the table of contents information (TOC information) recorded in a groove or pre-mastered pits formed on the radially innermost area of the optical disc, it is detected on which recording layer the recording and/or reproduction is to be made, The servo controller 9 controls the focal length in the optical pickup 3, that is, the position of a collimator lens 33, as later explained, in dependence upon the results of discrimination by the disc sort discriminating unit 22. The servo controller 9 is able to locate an area for recording and/or reproduction by e.g. detecting the relative position between the optical pickup 3 and the optical disc 2. This relative position may also be detected based on an address signal recorded on the optical disc 2.

With the recording and/or reproducing apparatus 1, described above, the optical pickup 2 is run in rotation by the spindle motor 4, and the feed motor 5 is driven under control by a control signal from the servo controller 9 to cause movement of the optical pickup 3 to a desired recording track on the optical disc 2 to record and/or reproduce the information for the optical disc 2.

The aforementioned optical pickup 3 for recording and/or reproduction will now be explained in detail.

Figure 2:
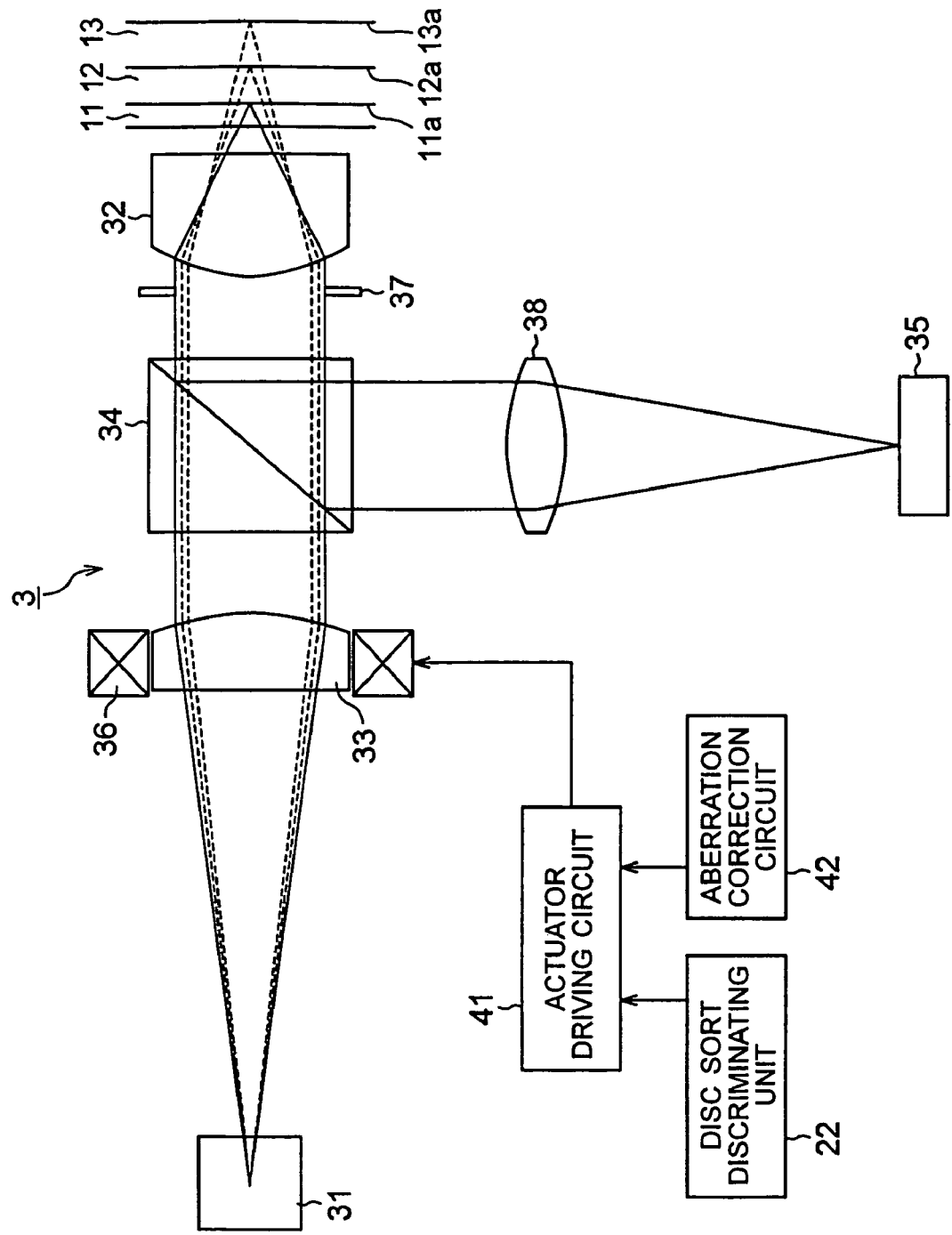
FIG. 2 schematically shows the optical system of an optical pickup embodying the present invention.

Referring to FIG. 2, the optical pickup 3, embodying the present invention, includes a light source unit 31 for radiating plural light beams of different wavelengths, an objective lens 32 for condensing the light radiated from the light source unit 31 to a signal recording surface of the optical disc 2, a collimator lens 33 provided between the light source unit 31 and the objective lens 32 and which has different focal lengths in dependence upon the wavelengths of the light beams, a beam splitter 34 for causing the light path of the return light, reflected back from the signal recording surface, to branch from the light path of the radiated light beam, and a photodetector 35 for receiving the return light separated by the beam splitter 34.

The light source unit 31 is made up by a first radiating unit for radiating a light beam of a first wavelength on the order of 405 nm, a second radiating unit for radiating a light beam of a second wavelength on the order of 655 nm, and a third radiating unit for radiating a light beam of a third wavelength on the order of 780 nm, to the first optical disc 11. The first to third radiating units of the light source unit 31 are housed in a sole package and are arranged so that light emitting points of the respective radiating units are slightly offset from one another.

The collimator lens 33 used has different focal lengths depending on the wavelength. That is, the collimator lens 33 varies the angle of divergence of the incident light beam and has different quantities of variation depending on the wavelengths of the incident light beams. The collimator lens 33 resolves the problem in the conventional optical pickup that radiating units associated with the respective wavelengths have to be arranged at different positions such that it is possible to adjust the focal lengths of the light beams of different wavelengths radiated from the same light source unit.

The collimator lens 33 is provided with an actuator 36 for displacing the collimator lens 33 in the direction of the optical axis. The actuator 36 is provided at preset positions that are in keeping with the different sorts of the optical disc 2. Since the collimator lens 33 may be moved to a preset position in the direction of the optical axis, based on the above-described wavelength dependent properties and the actuator 36, the focal lengths of the light beams of different wavelengths, radiated from the same light source unit, can be adjusted, and hence the light beams can be properly focused via the objective lens 32 on the respective signal recording surfaces 11a to 13a of the first to third optical discs 11 to 13 having different protective substrate thicknesses. 37.

Moreover, if there is an error in the thickness of the protective substrate of the optical disc 2, the collimator lens 33 may be moved by the actuator 36 along the optical axis for correcting the spherical aberration that may possibly be generated.

The objective lens 32 is a three wavelength compatible objective lens. The numerical aperture of the objective lens 32 is 0.85, 0.60 and 0.45 for the first wavelength, second wavelength and for the third wavelength, respectively. The objective lens 32 is able to condense the light beam of the first wavelength, the angle of divergence of which has been varied by the collimator lens 33, on the first optical disc 11 having the first protective substrate thickness. The objective lens 32 is also able to condense the light beam of the second wavelength, the angle of divergence of which has been varied by the collimator lens 33, and the light beam of the third wavelength, the angle of divergence of which has been varied by the collimator lens 33, on the second optical disc 12 having the second protective substrate thickness and on the third optical disc 13 having the third protective substrate thickness, respectively. The objective lens 32 may be a lens of the so-called zone division lens for coping with three different wavelengths.

An aperture filter 37, as an aperture limiting element, is provided on the light incident side of the objective lens 32 for limiting the aperture of the light beam incident on the objective lens 32. This aperture filter 37 has wavelength dependency in the sense that the aperture diameter is varied with the wavelength, such that the numerical aperture of the objective lens is 0.85, 0.60 and 0.45 for the first wavelength, second wavelength and for the third wavelength, respectively. As the aperture filter 37, a hologram, for example, is used.

The beam splitter 34 is arranged on a light path between the collimator lens 33 and the objective lens 32 for causing the light path of the return light to branch from the optical disc 2 towards the photodetector 35 for radiating the resultant beam. An optical component 38, such as a cylindrical lens, for condensing the laser light, the light path of which has been caused to branch as described above, to the light receiving surface of the photodetector 35, is provided between the beam splitter 34 and the photodetector 35.

The optical pickup 3 includes an aberration correction circuit 42 for detecting the generation of the spherical aberration from a detection signal as detected by the photodetector 35 to generate a signal for aberration correction, and an actuator driving circuit 41 which is responsive to the signal for aberration correction, generated by the aberration correction circuit 42, to drive the actuator 36. The collimator lens 33 is displaced by the actuator 36, controlled by the actuator driving circuit 41, to a position of zero spherical aberration.

The actuator driving circuit 41 is also responsive to a detection signal from the disc sort discriminating unit 22 to cause movement of the collimator lens 33 to preset positions matched to the first to third optical discs 11 to 13.

The light path of the laser light, radiated from the light source unit of the optical pickup 3, will now be explained. In the following, it is assumed that the information is to be written or read out for the first optical disc 11. The explanation for the second and third optical disc is omitted because the light path for the second or third optical disc is similar to that for the first optical disc.

The disc sort discriminating unit 22, which has discerned that the optical disc 2 is the first optical disc, causes the light beam of the first wavelength to exit from the first radiating unit of the light source unit 31. On receipt of a signal from the disc sort discriminating unit 22, the actuator driving circuit 41 drives the actuator 36 to cause movement of the collimator lens 33 to a position matched to the first optical disc 11.

The light beam of the first wavelength, exiting from the first radiating unit of the light source unit 31, has its angle of divergence varied in an amount matched to the first wavelength, by the collimator lens 33, displaced to a preset position, and is radiated towards the objective lens 32.

The light beam, having the angle of divergence converted by the collimator lens 33, is passed through the beam splitter 34 and has the numerical aperture set to 0.85 by the aperture filter 37 so as to be then condensed by the objective lens on the signal recording surface 11a of the first optical disc 11.

The light beam, condensed on the first optical disc 11, is reflected by the signal recording surface, and is transmitted through the objective lens 32. The light beam is then reflected by the beam splitter 34 and radiated towards the photodetector 35. The laser light beam, the light path of which has been caused to branch by the beam splitter 34, is condensed and detected on the light receiving surface of the photodetector 35.

The actuator driving circuit 41 causes movement of the collimator lens 33, depending on the detection signal, by the aberration correction circuit 42, such as to correct the spherical aberration of the laser light, received by the photodetector 35, to correct the spherical aberration generated due to an error in the thickness of the protective substrate of the first optical disc 11.

In reading out or writing the information for the second optical disc 12 or the third optical disc 13, the collimator lens 33 is moved, in dependence upon a detection signal from the disc sort discriminating unit 22, so that the light beams of the second wavelength or the third wavelength, radiated from the second or third radiating units of the light source unit 31, respectively, will be condensed on signal recording surfaces 12a or 13a of the second or third optical disc 12, 13, respectively, and subsequently the position of the collimator lens 33 is adjusted, such as to correct the spherical aberration, produced due to an error in the thickness of the protective substrate of the optical disc in question, as in the case described above.

With the optical pickup 3, embodying the present invention, the laser light beam may properly be condensed on the signal recording surface of the optical disc, by displacing the collimator lens 33, exhibiting wavelength dependency, while the three wavelength compatibility may be achieved and the spherical aberration caused by an error in the thickness of the protective substrate of each optical disc may be corrected satisfactorily by displacing the collimator lens 33 such as to correct the spherical error.

Moreover, with the optical pickup 3, embodying the present invention, information signals may be written or read out satisfactorily for the first to third optical discs 11 to 13 of different formats, as the spherical aberration of the light beams of different wavelengths, radiated from different radiating units, arranged with slight difference in light radiating points in a sole package, is corrected satisfactorily by a common collimator lens and a common objective lens. In addition, the optical pickup may be simplified in structure and reduced in size, while the production cost thereof may also be reduced.

With the recording and/or reproducing apparatus 1, embodying the present invention, information signals may be recorded and/or reproduced satisfactorily, while the spherical aberration ascribable to an error in the thickness of the protective substrate of each disc may be corrected satisfactorily, using a common objective lens and a common collimator lens for the first to third optical discs of different formats. Hence, plural optical recording mediums may be coped with, and the apparatus may be simplified in structure and reduced in size, while the production cost may be reduced.

The present invention may be applied to an optical pickup, configured for recording and/or reproducing optical recording mediums of different protective substrate thicknesses, using light beams of different wavelengths, even though the optical recording mediums are of formats different from those described above. For example, the optical disc may be any of recording and/or reproducing discs of various systems, employing the optical modulation recording, optical discs, including magneto-optical discs, phase change recording discs or dye recording discs, more specifically, any of a large variety of photo-magnetic recording mediums, including 'CD-R/RW', 'DVD-RAM', 'DVD-R/RW' or 'DVD+RW'. The optical disc may be such a disc the recording layer of which is divided into at least two recording areas having different optimum recording and/or reproducing light power values, or such a disc including plural recording layers deposited together via transparent substrates.

It should be understood by those skilled in the art that various modifications, combinations sub-combinations and alterations may occur depending on design requirements and other factors insofar as they are within the scope of the appended claims or the equivalents thereof.

What is claimed is:

1. An optical pickup comprising:
a light source unit having a first radiating unit configured to radiate a light beam of a first wavelength, a second radiating unit configured to radiate a light beam of a second wavelength and a third radiating unit configured to radiate a light beam of a third wavelength;
a collimator lens having three different focal lengths that are respectively dependent on one of said first, second, or third wavelengths; and
an objective lens configured to condense three different light beams that are respectively radiated from said first, second, and third radiating units on respective signal recording surfaces of three different types of optical discs such that the light beam of the first wavelength is condensed on a first optical disc having a first protective substrate, the light beam of the second wavelength is condensed on a second optical disc having a second protective substrate and the light beam of the third wavelength is condensed on a third optical disc having a third protective substrate, a thickness of the third protective substrate being greater than a thickness of the second protective substrate and the thickness of the second protective substrate being greater than a thickness of the first protective substrate, the collimator lens being provided between the light source unit and a beam splitter configured to cause a light path of return light that is reflected back from a respective signal recording surface of a respective one of the three different types of optical discs to branch from the respective one of the three different types of optical discs such that the collimator lens is configured to collimate light from the light source unit, and such that the objective lens is configured to receive light from the collimator lens.

2. The optical pickup according to claim 1 further comprising an actuator configured to move said collimator lens along an optical axis direction.

3. The optical pickup according to claim 2, wherein said collimator lens is configured to be moved along the optical axis direction, depending on a respective one of said first, second, and third wavelengths of light radiated from said light source unit, to adjust a focal point position on a signal recording surface of said optical disc.

4. The optical pickup according to claim 2, wherein said collimator lens is configured to be moved along the optical axis direction, depending on a thickness of a protective substrate on the light beam incident side of said optical disc, in order to correct a spherical aberration.

5. The optical pickup according to claim 1, wherein said light source unit includes said first, second, and third radiating units arranged in a single package with a slight position offset relative to one another.

6. The optical pickup according to claim 1, wherein the first, second, and third wavelengths, radiated from said light source unit, are approximately 405 nm, 655 nm and 785 nm, respectively.

7. The optical pickup according to claim 1 wherein the beam splitter is configured to separate the light beams radiated from the first, second, and third radiating units such that the light beams that proceed towards the optical disc are separated from the light beams reflected back from the optical disc; and wherein the optical pickup further includes a photodetector configured to receive the reflected light beams separated by said beam splitter.

8. A recording and/or reproducing apparatus comprising:

an optical pickup for recording and/or reproducing the information for an optical disc and disc rotating driving means for rotationally driving said optical disc, wherein said optical pickup includes a light source unit having a first radiating unit configured to radiate a light beam of a first wavelength, a second radiating unit configured to radiate a light beam of a second wavelength and a third radiating unit configured to radiate a light beam of a third wavelength;

a collimator lens having three different focal lengths that are respectively dependent on one of said first, second, or third wavelengths; and an objective lens configured to condense three different light beams that are respectively radiated from said first, second, and third radiating units, on respective signal recording surfaces of three different types of optical discs such that the light beam of the first wavelength is condensed on a first optical disc having a first protective substrate, the light beam of the second wavelength is condensed on a second optical disc having a second protective substrate and the light beam of the third wavelength is condensed on a third optical disc having a third protective substrate, a thickness of the third protective substrate being greater than a thickness of the second protective substrate and the thickness of the second protective substrate being greater than a thickness of the first protective substrate, the collimator lens being provided between the light source unit and a beam splitter configured to cause a light path of return light that is reflected back from a respective signal recording surface of a respective one of the three different types of optical discs to branch from the respective one of the three different types of optical discs such that the collimator lens is configured to collimate light from the light source unit, and such that the objective lens is configured to receive light from the collimator lens.

9. The recording and/or reproducing apparatus according to claim 8, wherein said optical pickup includes an actuator configured to move said collimator lens along an optical axis direction.

10. The recording and/or reproducing apparatus according to claim 9, wherein said collimator lens is configured to be moved along the optical axis direction, depending on a respective one of said first, second, and third wavelengths of light radiated from said light source unit, in order to adjust a focal point position.

11. The recording and/or reproducing apparatus according to claim 9, wherein said collimator lens is configured to be moved along the optical axis direction, depending on a thickness of a protective substrate on the light beam incident side of said optical disc, in order to correct a spherical aberration.

12. The recording and/or reproducing apparatus according to claim 9, further comprising:

a decision unit configured to discriminate a type of optical disc in order to effect recording and/or reproduction;

said collimator lens being displaced along the optical axis direction, depending upon the sort of the optical disc discriminated by said decision unit.

13. The recording and/or reproducing apparatus according to claim 8, wherein said light source unit includes said first, second, and third radiating units arranged with a slight position offset relative to one another in a single package.

14. The recording and/or reproducing apparatus according to claim 8, wherein the first, second, and third wavelengths, radiated from said light source unit, are approximately 405 nm, 655 nm and 785 nm, respectively.

15. The recording and/or reproducing apparatus according to claim 8, wherein the beam splitter is configured to separate the light beams radiated from the first, second, and third radiating units such that the light beams that proceed towards the optical disc are separated from the light beams reflected back from the optical disc; and wherein the optical pickup further includes a photodetector configured to receive the reflected light beams separated by said beam splitter.

16. An optical pickup comprising:

a light source unit including a first means for radiating a light beam of a first wavelength, a second means for radiating a light beam of a second wavelength and a third means for radiating a light beam of a third wavelength;

a collimator lens including three different focal lengths that are respectively dependent on one of said first, second, or third wavelengths; and means for condensing three different light beams that are respectively radiated from said first, second, or third radiating units on respective signal recording surfaces of three different types of optical discs such that the light beam of the first wavelength is condensed on a first optical disc having a first protective substrate, the light beam of the second wavelength is condensed on a second optical disc having a second protective substrate and the light beam of the third wavelength is condensed on a third optical disc having a third protective substrate, a thickness of the third protective substrate being greater than a thickness of the second protective substrate and the thickness of the second protective substrate being greater than a thickness of the first protective substrate, the collimator lens being provided between the light source unit and means for causing a light path of return light that is reflected back from a respective signal recording surface of a respective one of the three different types of optical discs to branch from the respective one of the three different types of optical discs such that the collimator lens is configured to collimate light from the light source unit, and such that the means for condensing is configured to receive light from the collimator lens.

17. The optical pickup according to claim 16, further comprising means for moving said collimator lens along an optical axis direction.

18. The optical pickup according to claim 17, wherein said means for moving said collimator lens moves said collimator lens along the optical axis direction, depending on a respective one of said first, second, and third wavelengths of light radiated from said light source unit, to adjust a focal point position on a signal recording surface of said optical disc.

19. The optical pickup according to claim 17, wherein said means for moving said collimator lens moves said collimator lens along the optical axis direction, depending on a thickness of a protective substrate on the light beam incident side of said optical disc, in order to correct a spherical aberration.

20. The optical pickup according to claim 16, wherein said light source unit includes said first, second, and third means for radiating arranged in a single package with a slight position offset relative to one another.

21. The optical pickup according to claim 16, wherein the first, second, and third wavelengths radiated from said light source unit are approximately 405 nm, 655 nm and 785 nm, respectively.

22. The optical pickup according to claim 16, wherein the means for causing the light path of return light to branch from the respective one of the three different types of optical discs separates the light beams radiated from the first, second, and third radiating means such that the light beams that proceed towards an optical disc are separated from the light beams reflected back from the optical disc; and wherein the optical pickup further includes means for receiving the reflected light beams separated by said means for separating the light beams.

\* \* \* \* \*